UNITED STATES PATENT OFFICE.

WILLIAM SPEIRS SIMPSON AND HOWARD OVIATT, OF LONDON, ENGLAND.

METALLURGY OF STEEL.

No. 918,382.  Specification of Letters Patent.  Patented April 13, 1909.

Application filed November 16, 1908. Serial No. 462,906.

*To all whom it may concern:*

Be it known that we, WILLIAM SPEIRS SIMPSON, a subject of the King of Great Britain, and HOWARD OVIATT, a citizen of the United States of America, both residing at London, England, have invented certain new and useful Improvements in Connection with the Metallurgy of Steel, of which the following is a specification.

This invention has for its object the reduction of iron oxids to metal and the production of steel and various alloys thereof direct from iron ores especially from the ores in which iron occurs as an oxid; such for instance as hematite and magnetite or their compounds.

The method or process is adaptable to any form of iron oxid capable of being crushed or ground for mixing purposes as hereinafter set forth, but is peculiarly adapted to the treatment of concentrates or of ores already existing as natural products, such as magnetic iron sand or of partially decomposed sesquioxid of iron.

In carrying out the purposes of the invention we thoroughly mix any convenient quantity of suitable ore or mixtures of ores which if not already in a comparatively fine state of division has been so prepared, with an aqueous solution sufficient in quantity to form a stiff paste suitable for being placed in or packed into a receptacle prepared for the purpose and made ready as a furnace or crucible charge for being subjected to heat. This solution is composed of water and a carbo-hydrate such as sugar or other saccharine substance or compound, or such as starch, flour or other starchy substance or compound. It is advisable (but not necessary) that the solution should be made with hot water in order to more perfectly dissolve the carbo-hydrate employed. The quantity of such carbo-hydrate required to effect the desired result in respect to the reduction of the metallic oxids under treatment and the production of steel therefrom, varies according to the character of the carbo-hydrate so employed and according to the character of the ore or mixture of ores to be reduced and converted into steel. Thus if magnetic iron sand (which contains but a small proportion of gangue) represents the ore to be reduced and converted into steel and if ordinary brown sugar represents the carbo-hydrate to be employed, the quantity of sugar should be approximately equal to four or five per cent. of the weight of the ore to be treated. The employment of an excess of such carbo-hydrate is not detrimental to the accomplishment of the desired result and in some cases if an excess of sugar is employed the water may be omitted. In addition to the carbo-hydrate dissolved or mixed with water in the manner described there is also thoroughly mixed with the ore to be treated either a small quantity of finely powdered manganese dioxid equal to from 3% (or less) to 6% (and upward) of the weight of the iron ore (according to the character of the ore and the result required) or instead thereof an equivalent quantity of finely ground manganese ore containing the requisite proportion of manganese dioxid.

In some cases, when the iron ore contains a considerable percentage of silica, alumina, lime or other gangue, the carbo-hydrate employed may, with advantage, be considerably increased. In almost every case unless already present in the crude ore there should also be intimately and thoroughly mixed with the ore charge, sufficient lime, alumina, silica, or other convenient fluxing material which has been crushed or ground for the purpose, in suitable proportions to form, during the process of heating and reduction, a liquid slag, which may be either acid or basic as may be best suited to the ore under treatment.

In case it is desired to produce steel containing any fixed percentage of combined carbon it is necessary to add to the ore charge before subjecting the same to heat, a suitable quantity of finely ground graphite or other suitable form of carbon which should be carefully mixed with the iron ore or mixture of ores before the carbo-hydrate and the water are mixed therewith. The quantity of graphite to be used for this purpose will vary with the different qualities and characteristics of the iron ore under treatment, but the general statement may be made that 2% of graphite added to the charge will result in a high carbon steel containing about .87% of combined carbon and that 4% of graphite will result in a steel containing 1.95% of combined carbon. In fact by this simple method any desirable percentage of combined carbon may (at the will of the operator) be introduced into the steel during the process of reducing the ore from which the same is made. And such steel will contain no graphitic (uncombined) carbon. To obtain uniform results there must be selected a form of carbon, effective, under the conditions wherein it is employed, to carburize the steel rather than to act as a reducing agent to the metallic oxids.

The ore charge having been prepared in the manner hereinbefore described may be placed in any suitable receptacle or vessel (with or without a cover) and subjected to heat in any convenient manner or in any convenient form of furnace wherein it is practicable to create and maintain a heat equal to or somewhat higher than the melting point of steel. Or the prepared ore charge may be packed into or suitably placed within the hearth of a furnace such as a Siemans' open hearth regenerative furnace fired by producer gas. The hearth of such furnace should be provided with a suitable lining composed of such material as ganister, magnesite, or a refractory carbonaceous compound. When subjected to a heat varying from 2600° F. to 3000° F., for a period of time varying from two hours to five hours (and upward) according to the magnitude of the charge, there is produced mild steel (low in carbon) or a steel (high in carbon) equal to the best crucible steel, of great purity and uniformity of character and of the highest quality. The percentage of combined carbon contained therein being entirely at the command of the operator.

If it is required to produce steel containing various other metals desirable as alloys, a suitable mixture of ores containing the metals required, in the desired proportions, may be brought together in the ore charge and the requisite steel alloy will in most cases result from the one operation.

In some cases and with some ores it is desirable to augment the action of the carbohydrates mentioned (sugar, starch etc.) by associating with the ore and fluxes a small quantity of ground coke, coal, charcoal or other form of carbon not exceeding 15 or 20 per cent. of the weight of the ore; which may or may not be intimately mixed therewith; but must be of such a character and be employed under such conditions as to assist in the reduction of the metallic oxids rather than to carburize the metal. And in some cases where a considerable proportion of lime is to be employed for fluxing purposes the same may be introduced in the form of ground calcium carbonate mixed with about 12% of its own weight of finely ground charcoal or other carbon; it may be placed in the bottom of the receptacle or furnace hearth before the ore charge is placed therein; which mixture, when heated, yields active reducing gases.

What we do claim as our invention, and desire to secure by Letters Patent is:—

1. A process of manufacturing steel directly from ore which involves reducing the ore by means of a carbo-hydrate and effecting carburization of the metal by means of another form of carbon at the same operation.

2. A process of producing steel directly from ore which involves the intimate association of a carburizing carbon and a reducing carbo-hydrate with the ore, and then heating the ore charge thus prepared to effect its reduction and the carburization of the metal.

3. A process of manufacturing steel directly from ore which involves the intimate association of ore in a fine state of division, graphite and a reducing carbo-hydrate in combination with an aqueous liquid, and then heating the ore charge thus prepared to effect its reduction and the carburization of the metal.

4. An improvement in the art of manufacturing steel directly from ore which consists in associating a suitable percentage of finely ground graphite with the ore in a fine state of division and adding thereto a reducing carbonaceous substance containing water, and then heating the ore charge thus prepared to effect its reduction and the carburization of the metal.

5. A process of manufacturing steel which consists in preparing an ore charge containing a carburizing carbon, a reducing carbohydrate and a suitable percentage of manganese dioxid and a fluxing material suitable to produce a liquid slag, all in a fine state of division and intimately mixed, and then heating the ore charge thus prepared to reduce it and to purify and carburize the metal.

6. A process of manufacturing steel directly from iron ores which consists in preparing an ore charge containing the ore in a fine state of division, a carbo-hydrate combined with water, and manganese dioxid, all intimately mixed, and heating the ore charge thus prepared to effect its reduction and conversion of the metal into steel.

7. An improvement in the art of manufacturing steel directly from iron ores which consists in intimately associating a carburizing carbon with the ore in a fine state of division and adding thereto a carbo-hydrate, and then heating the ore charge thus prepared.

8. The herein described improvement in the process of manufacturing steel which consists in mixing a carburizing carbon with iron ore in a fine state of division, adding thereto a carbo-hydrate and an aqueous liquid, and then heating the ore charge thus prepared.

9. A process of manufacturing steel directly from iron ores which involves the mixing of finely ground graphite with the ore in a fine state of division, adding to said mixture a carbo-hydrate dissolved in water, and then heating the ore charge thus prepared.

10. The herein described improvement in the art of reducing ores which consists in associating with an ore charge containing a carbo-hydrate and manganese dioxid a mixture of calcium carbonate and a suitable carbon both in a fine state of division and intimately mixed, which under heat are effective to yield reducing gases.

In testimony whereof we have hereunto set our hands in presence of two subscribing witnesses.

WILLIAM SPEIRS SIMPSON.
HOWARD OVIATT.

Witnesses:
RICHARD COVE GARDNER,
LYNWOOD T. GARDNER.